A. B. BAUM.
Harrow and Cultivator.
No. 105,770.             Patented July 26, 1870.
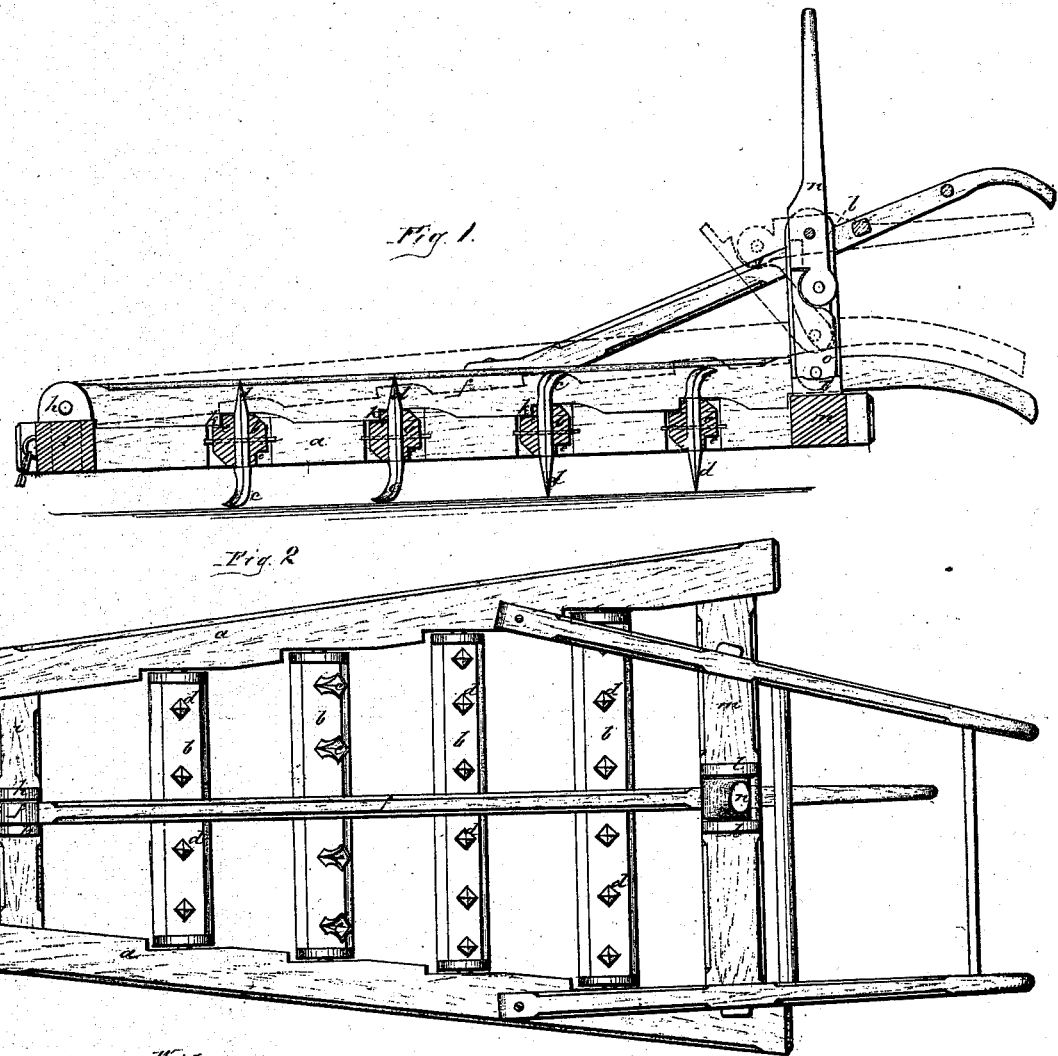

United States Patent Office.

ALBERT B. BAUM, OF GRANTVILLE, PENNSYLVANIA.

Letters Patent No. 105,770, dated July 26, 1870.

IMPROVED COMBINED HARROW AND SHOVEL-CULTIVATOR.

The Schedule referred to in these Letters Patent and making part of the same.

To all whom it may concern:

Be it known that I, ALBERT B. BAUM, of Grantville, in the county of Dauphin and State of Pennsylvania, have invented a new and improved Combined Harrow and Shovel-Cultivator; and I do hereby declare that the following is a full, clear, and exact description of the same, reference being had to the accompanying drawing forming a part of this specification, in which—

Figure 1 is a sectional elevation, and
Figure 2 is a plan view.

This invention consists of bars mounted transversely of a frame, so as to turn freely therein, except when prevented from rotating by means hereinafter described, and provided each with two different sets of teeth, projecting from opposite sides of the bars, one set being pyramidal, or such as are ordinarily used in harrows, and the other set being shovels, such as are ordinarily used in cultivators, the object of this arrangement being to use either kind of teeth, as may be expedient.

The invention also consists in the combination of such bars with a peculiar apparatus for preventing the rotation of the same during such time as the teeth of one sort are in use, and for releasing the bars, and allowing them to turn half round when the teeth of the other kind are to be employed.

In the drawing—

$a\ a$ are the side beams of the frame.

$b$ are the transverse bars, from the ends of which journals project into the bars $a$.

$c$ are the shovels, projecting from one side of each bar.

$d$ are the harrow-teeth, projecting from the opposite side of each bar.

$e$ are notches, cut in opposite corners, at the middle of each bar.

$f$ is a lever, pivoted, at one end, in lugs $h\ h$ on the front cross-beam $i$ of the frame, and extending rearward centrally of the frame.

$k$ are teeth, on the under side of the lever, which, when the latter is down, enter the notches $e$, and prevent the rotation of the bars $b$.

$l\ l$ are standards, springing from the rear cross-bar $m$ of the frame, between which standards the lever $f$ lies.

$n$ is a lever, pivoted between the standards $l$, near the top of the same.

$o$ is a link, jointed at its lower extremity to the lever $f$, and at its upper end to the lever $n$.

When the lever $n$ is in a vertical position, the link $o$ is crowded down upon the lever $f$, the latter pressed into the recesses $e$ of the bars $b$, and, consequently, these bars are unable to rotate.

When the operator wishes to change from harrow to cultivator, or the reverse, he turns the lever $n$ downward, which movement raises the lever $f$, and leaves the bars free to be rotated by the forward movement of the frame.

Having thus described my invention,

What I claim as new, and desire to secure by Letters Patent, is—

1. The rotary bars $b$, provided each with a set of harrow-teeth, $d$, and a set of shovels, $c$, in the manner and for the purpose described.

2. The combination of the bars $b$, levers $f\ n$, standards $l$, and link $o$, in the manner and for the purpose specified.

ALBERT B. BAUM.

Witnesses:
SOLON C. KEMON,
HARRY M. PHILLIPS.